United States Patent [19]

Baker

[11] 4,375,662
[45] Mar. 1, 1983

[54] METHOD OF AND APPARATUS FOR ENABLING OUTPUT POWER OF SOLAR PANEL TO BE MAXIMIZED

[75] Inventor: Richard H. Baker, Bedford, Mass.

[73] Assignee: Exxon Research and Engineering Co., Florham Park, N.J.

[21] Appl. No.: 97,204

[22] Filed: Nov. 26, 1979

[51] Int. Cl.³ .................... H02P 13/18; G05F 5/00
[52] U.S. Cl. ................... 363/95; 323/299; 323/906; 363/42
[58] Field of Search .............. 323/299, 303, 906; 363/42, 43, 95; 324/142; 307/66, 151; 328/114, 132

[56] References Cited

U.S. PATENT DOCUMENTS

| | | | |
|---|---|---|---|
| 3,222,535 | 12/1965 | Engelhardt | 307/66 |
| 3,343,911 | 9/1967 | Eisenlohr | 423/495 |
| 3,384,806 | 5/1968 | Hartman | 322/2 |
| 3,488,506 | 1/1970 | White | 250/212 |
| 3,489,915 | 1/1970 | Engelhardt | 307/66 |
| 3,626,198 | 9/1971 | Boehringer | 307/52 |
| 3,636,539 | 1/1972 | Gaddy | 340/870.39 |
| 3,696,286 | 10/1972 | Ule | 320/40 |
| 4,143,314 | 3/1979 | Gruben | 323/288 |
| 4,204,147 | 5/1980 | Larrabee | 323/906 |

FOREIGN PATENT DOCUMENTS

| | | | |
|---|---|---|---|
| 932393 | 8/1973 | Canada | 363/42 |
| 1804130 | 4/1970 | Fed. Rep. of Germany . | |
| 7209356 | 10/1973 | France . | |

OTHER PUBLICATIONS

Franx, "A New Approach to Solar Pump Systems Using Submersible Motors," Conference Paper, 2nd E.C. Photovoltaic Solar Energy Conference, Berlin, West Germany, pp. 1038–1046, 23–26, Apr. 1979, 503400052.

Roesler, "A 60 KW Solar Cell Power System with Peak Power Tracking and Utility Interface," Conference Paper, 13th IEEE Photovoltaic Specialists Conference, Washington, D. C. USA, pp. 978–983, 5–8 Jun. 1978, 590150071.

New Horizons for Analog Control, vol. 9, No. 4, pp. 261–269, 'ISA Transactions'.

PCSC '70 Record, pp. 133–134.

Electronic Design, vol. 16, No. 4, pp. 112, 114, Feb. 15, 1968.

Power Conditioning Specialists Conference, (PCSC '70 Record), pp. 128–136, Apr. 1970.

*Primary Examiner*—William H. Beha, Jr.
*Attorney, Agent, or Firm*—Allan M. Lowe

[57] ABSTRACT

The d.c. power supplied by a photovoltaic solar panel to a load is controlled by monitoring the slope of the panel voltage vs. current characteristic and adjusting the current supplied by the panel to the load so that the slope is approximately unity. The slope is monitored by incrementally changing the panel load and indicating whether the resulting change in current derived from the panel is above or below a reference value, indicative of the panel voltage. In response to the change in the monitored current being above the reference value, the slope of a voltage vs. current curve is greater than unity and the load is adjusted to decrease the current supplied by the panel to the load. Conversely, in response to the current being less than the reference value, the slope of the voltage vs. current curve is less than unity and the load is adjusted to increase the current supplied by the panel to the load.

42 Claims, 3 Drawing Figures

METHOD OF AND APPARATUS FOR ENABLING OUTPUT POWER OF SOLAR PANEL TO BE MAXIMIZED

TECHNICAL FIELD

The present invention relates generally to a method of and apparatus for controlling and/or monitoring the d.c. output power derived from a photovoltaic solar panel and the power supplied by the panel to a load, and more particularly, to such a method and apparatus wherein an output parameter of the panel is monitored to indicate whether the value of the slope of a voltage versus current curve of the panel is greater or less than unit.

BACKGROUND ART

A photovoltaic solar panel has an output voltage vs. current paramater characteristic that is a family of curves dependent on the solar energy incident on the panel, and the panel temperature. For a given panel temperature, the open circuit voltage of the panel increases as the level of incident solar energy on the panel increases. As temperature increases, the open circuit voltage decreases. Each curve has a maximum power point, where the slope of the curve has a value approximately equal to minus one. The curves have slopes with absolute values greater and less than unity for currents respectively greater than and less than at the maximum power point.

While several systems have been devised to control a photovoltaic solar panel so it operates at the maximum power point, the prior art systems have either been overly simplistic or relatively complex. For example, in Engelhardt. U.S. Pat. No. 3,222,535, a dummy load is selectively connected in circuit with the output of a photovoltaic solar panel and the load connected to the solar panel. A change in panel output power resulting from the insertion of the dummy load is monitored by utilizing a Hall plate that monitors the panel output voltage and current. If no change in the output power is monitored, an indication is provided that the solar panel is operating at the maximum power point. If insertion of the dummy load causes the output power to increase or decrease, indications are respectively derived that the load current derived from the array is to increase or decrease. This prior art system is disadvantageous because it requires passing the load current through a Hall plate, a device incapable of withstanding substantial amounts of current. In addition, analog multiplication devices, including Hall plates, are generally inaccurate, and, therefore, are likely to cause the load current to be set to an improper value for maximum output current.

In Hartman, U.S. Pat. No. 3,384,806, the maximum power point of a photovoltaic solar cell array or panel is controlled by providing a wattmeter responsive to the output of the array. The output of the wattmeter is differentiated. In response to the derivative of the wattmeter output being zero, an indication is provided that the solar panel is deriving the correct output for maximum load. In response to a positive or negative derivative of the wattmeter output, the load current is increased or decreased. The polarity of the wattmeter output is monitored by a relatively complex modulation and phase detecting apparatus.

Engelhardt, U.S. Pat. No. 3,489,915, discloses three different methods of adjusting the maximum power point of a photovoltaic solar panel. One technique requires one cell of the panel to be a "reference" cell that derives an open circuit voltage. Engelhardt assumes that the maximum power point is a predetermined percentage below the open circuit voltage derived by the referenced solar cell. Such a system is inefficient because it requires at least one cell in the panel to be utilized exclusively for control purposes; it is also believed overly simplistic in many instances because the response from a single cell of a panel may not accurately indicate the response of the entire cell and because the open circuit output voltage may not be a fixed ratio of the maximum power point voltage over the entire illumination and temperature range of the cell. In the second method disclosed in the Engelhardt '915 patent, a Hall plate derives an output voltage proportional to the power output of the array and an array regulator varies the load drawn from the array by a small amount. The phase of the power representing output voltage indicates whether an underload or overload condition exists. If the system is delivering maximum available power, the load variation causes excursions on both sides of the maximum power point whereby the Hall plate output voltage is a full recitified squarewave. This method suffers from the same disadvantages described supra in connection with the Engelhardt '535. In another method disclosed in the Engelhardt '915 patent, an a.c. load is connected across the solar panel output and is adjusted to equal the solar panel internal a.c. impedance. The internal impedance of the array is determined by varying the load periodically, to cause the load current, $I_b$, and load voltage, $V_a$, to change by $\Delta I_a$ and $\Delta V_a$ respectively. The a.c. internal impedance of the cell equals $\Delta V_a/\Delta I_a$; maximum power is supplied by the array to the load when $\Delta V_a/\Delta I_a$ equals $V_a/I_a$. A pair of multipliers derive the quantities $(I_a\Delta V_a)$ and $(V_a\Delta I_a)$ and a feedback loop including a comparator equalizes these quantities. Obviously, relatively complex and expensive circuit components, having a tendency to operate inaccurately, are required for such computations.

A further, relatively complex apparatus for assuring that maximum power is supplied by a photovoltaic solar panel to a load is disclosed by Gruber in a paper entitled "High Efficiency Solar Cell Array Peak Power Tracker and Battery Charger", given at the Power Conditioning Specialists Conference, Greenbelt, Md., April 1970; the article can be found on pages 128–136 of the PCSC, 1970 record. In Gruber's article, the output power of the solar cell is monitored by a wattmeter and differentiated. A switching regulator is connected between the array or panel output and the load. A reactance in the switching regulator is periodically perturbed, resulting in a similar perturbation on the output of the wattmeter. The output of the wattmeter is applied to a differentiator, having an output which is applied to a phase detector, also responsive to the perturbing source for the reactance of the switching regulator. The output of the phase detector controls an integrator, which in turn controls on and off times of the switching regulator. It is apparent that the system disclosed by Gruber is relatively complex.

It is, accordingly, an object of the present invention to provide a new and improved system for and method of monitoring and controlling the d.c. output power derived from a photovoltaic solar panel and the power supplied by the panel to a load.

Another object of the invention is to provide a new and improved method of and apparatus for controlling the d.c. output power derived from a photovoltaic solar panel and the power supplied by the panel to a load, wherein relatively simple circuitry that does not require the use of multipliers or wattmeters is employed.

DISCLOSURE OF THE INVENTION

In accordance with one aspect of the present invention, maximum power point tracking of a photovoltaic solar panel involves responding to one of the panel output parameters, (voltage or current) to determine whether the absolute value of the slope of the voltage vs. current curve of the panel is greater or less than unity. In response to the indicated slope absolute value being greater and less than unity, indications are respectively derived that the panel current should be decreased and increased. The slope of the current or voltage parameter is determined by incrementally changing the panel load. In response to the incremental load change, an indication is derived as to whether the change in the value of the monitored parameter is above or below a reference value, proportional to a d.c. output parameter of the panel, to indicate whether the slope is less than or greater than unity. In response to the slope absolute value being greater than and less than unity, the load is respectively decreased and increased. In a preferred embodiment, the panel load is incrementally changed to incrementally change the panel current. In response to the incremental current change, an a.c. voltage is derived; the peak value of the a.c. voltage is compared with a d.c. voltage proportional to the panel d.c. output voltage.

The invention is preferably employed in connection with a power switching inverter of the type disclosed in the copending, commonly assigned application, Ser. No. 846,696, filed Oct. 31, 1977 by Richard H. Baker and entitled "SYNTHESIZER CIRCUIT FOR GENERATING 3-TIER WAVEFORMS". Sucn an inverter responds to a three-tier waveform so it is switched to supply a load with a multilevel notched, voltage waveform which approximates a sine wave. Such an inverter is preferably driven by a function generator as disclosed in the commonly assigned, copending application Ser. No. 890,460, filed Mar. 27, 1978, now U.S. Pat. No. 4,167,775, by Richard H. Baker, et al, entitled "CONTROLLER FOR SYNTHESIZER CIRCUIT FOR GENERATING 3-TIER WAVEFORMS". The power delivered to the load by such an inverter is linearly proportional to the frequency at which the inverter is driven. The maximum power point tracking circuit of the present invention derives a d.c. voltage which is applied to the function generator, to control the frequency of the function generator and the switching frequency of the power inverter. The power inverter preferably drives a load, such as synchronous motor, with a constant volt per Hertz ratio so the power delivered to the power inverter is linearly proportional to the frequency. Thereby, as the maximum power which the solar panel is capable of delivering increases and decreases, the frequency of the synchronous motor respectively increases and decreases.

It is, therefore, a further object of the invention to provide a new and improved circuit for enabling maximum power to be transferred between a photovoltaic cell and an a.c. load.

Still another object of the invention is to provide a new and improved circuit for enabling maximum power to be transferred from a photovoltaic solar panel to an a.c. load via an inverter wherein output power increases as the chopping frequency thereof increases.

The above and still further objects, features and advantages of the present invention will become apparent upon consideration of the following detailed description of one specific embodiment thereof, especially when taken in conjunction with the accompanying drawings.

THE DRAWINGS

BEST MODE FOR CARRYING OUT THE INVENTION

Figure 1:
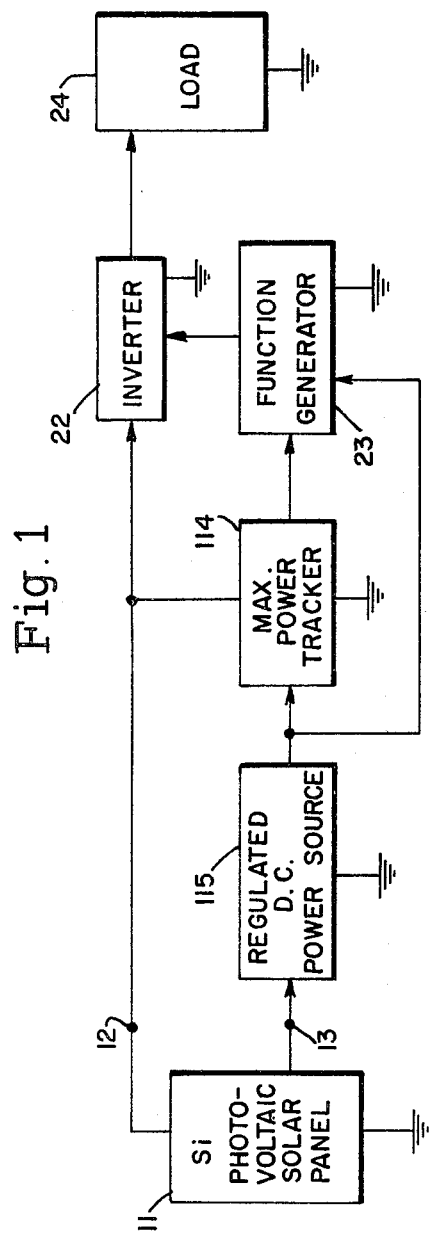
FIG. 1 is a block diagram of a preferred embodiment of a system in which the present invention is utilized.
Figure 2:
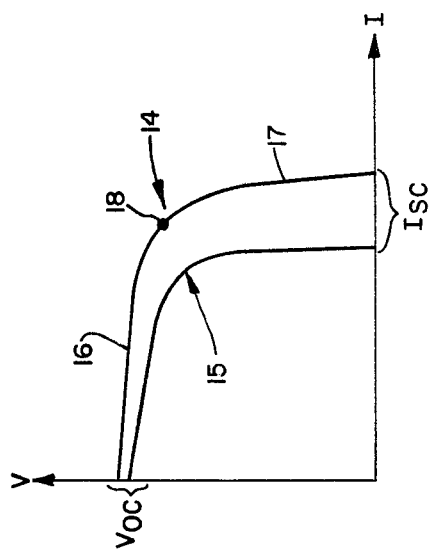
FIG. 2 are curves of the voltage versus current output of a solar panel utilized in FIG. 1.

Reference is now made to FIG. 1 of the drawing wherein there is illustrated a silicon photovoltaic solar panel 11 having a relatively high voltage output terminal 12 and an intermediate voltage output terminal 13 on which are derived d.c. voltages that are dependent upon the incident solar energy on panel 11 and the temperature of the panel. For maximum solar energy incident on panel 11 and typical terrestrial temperatures of the panel, the maximum open circuit voltages derived at terminals 12 and 13 are typically 85 and 29 volts, respectively. For a given temperature of panel 11, the open circuit voltages at terminals 12 and 13 increase as the amount of solar enegy incident on panel 11 increases. As the load on panel 11 increases, the output voltage of the panel, at terminal 12 or terminal 13, decreases, as indicated by curve 14, FIG. 2.

Curves 14 and 15 represent the voltage-current output parameters of panel 11 for two different levels of incident solar energy on the panel 11, while the panel is maintained at a given temperature. There is a family of curves similar to curves 14 and 15 to represent the voltage and current output parameters of the panel for different amounts of solar energy incident on the panel, at a given temperature. In general, the open circuit output voltage and short circuit output current of each curve in the family increases as the incident solar energy increases. As seen from curves 14 and 15, the short circuit current increase is typically much greater than the open circuit voltage increases as incident solar increases. Each of the curves in the family of curves includes two segments, one having a negative slope with an amplitude less than one and the other having a negative slope with an amplitude greater than one. In particular, curve 14 includes small (absolute value less than one) and large (absolute value greater than one) negative slope segments 16 and 17. Between slope segments 16 and 17 is maximum power point 18, where the voltage-current output curve of panel 11 has a slope of minus one. In accordance with the present invention, panel 11 is operated at or close to the maximum power point.

To this end, maximum power point tracker 114 has a single input between panel output terminal 12 and ground. Tracker 114 includes logic circuitry having a d.c. power supply input derived by regulated d.c. power source 115, connected to the intermediate output terminal 13 of panel 11. Source 115, includes Zener diode regulators which provide the desired power supply inputs to tracker 114 in response to the output of panel 11 reaching and exceeding a predetermined level.

Maximum power tracker 114 controls the chopping frequency of power inverter 22, which chops the d.c. voltage at terminal 12 into a pseudo sinusoidal wave that is applied to a.c. load 24, typically a synchronous motor. Inverter 22 derives a power output level directly proportional to the fundamental frequency it chops the voltage at terminal 12. Hence, as the chopping fundamental frequency of inverter 22 increases the load between the panel output terminal 12 and ground increases. In one preferred embodiment, inverter 22 chops the voltage at terminal 12 into a multilevel, notched pseudo sinusoidal wave and is configured as disclosed in my copending, commonly assigned application, Ser. No. 846,696, filed Oct. 31, 1977, entitled "SYNTHESIZER CIRCUIT FOR GENERATING 3-TIER WAVEFORMS". The chopping frequency of inverter 22 is controlled by a multilevel, notched pseudo sinusoidal wave supplied to the inverter by function generator 23, preferably of the type described in previously mentioned application Ser. No. 890,460. The fundamental output frequency of function generator 23 is controlled by the output of maximum power tracker 114. Logic circuitry in function generator 23 is powered by the output of regulated d.c. power source 15.

In operation, maximum power tracker 114 determines whether the voltage vs. current output parameters of panel 11 are slope segment 16 or 17. In response to tracker 114 sensing that the output parameters of panel 11 cause the panel to operate along slope segment 16, the tracker supplies an error voltage to function generator 23 to increase the fundamental frequency of the function generator output, and thereby increase the fundamental chopping frequency of inverter 22 whereby the current supplied by panel 11 to inverter 22 and load 24 increases. In response to tracker 114 sensing that panel 11 is operating along high slope segment 17, the tracker derives an error voltage that decreases the fundamental frequency of function generator 23, with a resulting decrease in chopping frequency of inverter 22 and a decrease in the current supplied by panel 11 through the inverter to load 24. If tracker 114 senses that panel 11 is operating at maximum power point 18, where the slope of the voltage-current output parameters of panel 11 is equal to minus 1, the output of tracker 114 supplies an input to generator 23 such that the output frequency of the generator does not change and inverter 22 continues to chop at the same frequency. Typically, the fundamental chopping frequency of inverter 22 is on the order of 60 Hertz, and tracker 114 responds to the output of panel 11 once every hundred milliseconds. Thereby, several cycles of a.c. power are coupled through inverter 22 to a.c. load 24 each time tracker 114 responds to panel 11 and the system has an opportunity to reach a relatively steady state condition between adjacent responses taken by tracker 114.

To determine the slope of the portion of curve 14 on which panel 11 is operating, a relatively small, constant current (for example, 100 milliamperes) is superimposed by tracker 114 on the current supplied by panel 11 to terminal 12, and the resulting change on the voltage at terminal 12 is determined. If the resulting voltage change is relatively small, an indication is provided that panel 11 is functioning along segment 16, and tracker 114 derives an increased d.c. output voltage which is coupled to function generator 23 to increase the fundamental chopping frequency of inverter 22. If, however, there is a relatively large change in the voltage resulting from the change in the load current of panel 11, an indication is derived that the panel is operating along segment 17 and tracker 114 derives a decreased output voltage which causes function generator 23 to decrease the fundamental chopping frequency of inverter 22. If the voltage change resulting from the incremental loading imposed by tracker 114 on the output of panel 11 at terminal 12 is equal to a reference value, there is no change in the output of tracker 114, and consequently no change is imposed by function generator 23 on the fundamental chopping frequency of inverter 22. The reference value is directly proportional to the panel output voltage.

Figure 3:
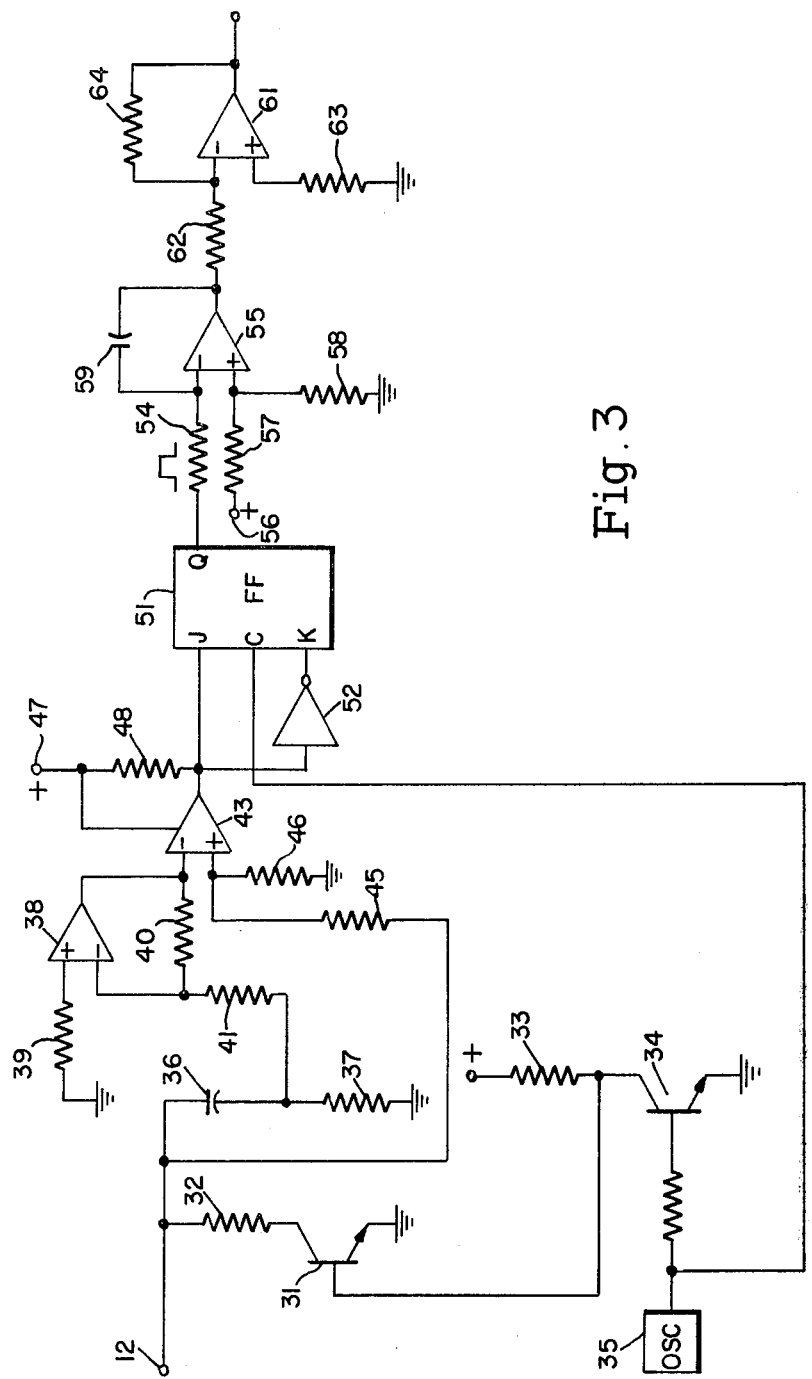
FIG. 3 is a circuit diagram of a preferred embodiment of the maximum power point tracker utilized in the system of FIG. 1.

Reference is now made to FIG. 3 of the drawings wherein there is illustrated a preferred embodiment of maximum power point tracker 114. Connected in shunt between panel output terminal 12 and ground is a series circuit including NPN transistor 31 and a relatively large resistor 32, connected in the collector circuit of the transistor. Resistor 32 has a relatively large value, and thereby appears as a constant current source between terminal 12 and ground while the emitter collector path of transistor 31 is in a conducting state. The emitter collector path of transistor 31 is periodically activated into a conducting state in response to a relatively low frequency square wave applied to the base of the transistor by the voltage developed across load resistor 33 in the collector circuit of common emitter NPN transistor 34, having a base driven by square wave oscillator 35, typically having a frequency of 10 Hertz. Power is supplied to the collector of transistor 34 through resistor 33 by the regulated d.c. output of power source 115; all of the other circuit elements in tracker 114 are also powered by the output of power source 115.

In response to the periodic loading of terminal 12 by the periodic shunting of the terminal by the shunt path established through the emitter-collector path of transistor 31 and resistor 32, there is a resulting change in voltage beweem terminal 12 and ground. As indicated supra, the magnitude of the voltage change is dependent on the portion of curve 14 on which panel 11 is operating. The voltage change magnitude is a measure of the a.c. impedance of the panel in response to the a.c. current superimposed on the panel output by the incremental loading change of the panel output by the periodic insertion of resistor 32 across the panel output. During each cycle of oscillator 35, the magnitude of the voltage change across transistor 31 and resistor 32 is compared against a reference proportional to the panel output voltage, to control the chopping frequency of inverter 22 once each cycle of oscillator 35.

To these ends, the square wave voltage changes between terminal 12 and ground, resulting from the square wave current changes drawn by transistor 31 and resistor 32 from panel 11, are converted into a variable amplitude a.c. voltage by a differentiator including a series capacitor 36 and shunt resistor 37. The a.c. voltage can be a series of positive and negative pulses or a square wave, dependent upon the values of capacitor 36 and resistor 37. In either event the voltage developed across resistor 37 has a zero average value, with positive and negative transitions having magnitudes dependent on the change in d.c. level at terminal 12 in response to the periodic load changes resulting from switching of transistor 31. The a.c. voltage developed across resistor 37 is coupled by input resistor 41 to an inverting input terminal of operational amplifier 38, having a noninverting input terminal connected to ground through resistor 39 and to feedback resistor 40. In response to the positive and negative going leading and trailing edges of the voltage changes between terminal 12 and ground, amplifier 38 derives a zero average value amplitude voltage having variable amplitude negative and positive edges with amplitudes proportional to the voltage changes between terminal 12 and ground. The output of amplifier 38 is coupled directly to an inverting input terminal of open loop, d.c. amplifier 43, having a noninverting input terminal responsive to a d.c. reference voltage indicative of the d.c. voltage at terminal 12.

The voltage at terminal 12 is coupled to the noninverting input of amplifier 43 by way of a resistive voltage divider including series resistor 45 and shunt resistor 46, having values such that the voltage changes at terminal 12 which result from periodic loading by resistor 32 are coupled to the amplifier noninverting input with an inconsequential amplitude relative to the voltage changes coupled to the amplifier inverting input. By proper selection of resistors 45 and 46, the noninverting input voltage of amplifier 43 has a d.c. value representing a slope of curve 14 equal to minus one. At the maximum power point for all curves in the family of curves, e.g. curves 14 and 15, the incremental current change caused by the periodic connection of resistor 32 across terminal 12 results substantially in a voltage change directly proportional to the panel output voltage. The positive d.c. voltage reference at the noninverting input terminal of amplifier 43 is compared with the variable amplitude negative going edges derived by amplifier 38 and coupled to the inverting input of amplifier 43.

The output of amplifier 43 is applied to J and K input terminals of J-K flip-flop 51; the connection to the K input terminal is provided by inverter 52. Flip-flop 51 includes a clock or trigger input responsive to negative going portions of the square wave output of oscillator 35. Thereby, flip-flop 51 is activated to the set and reset states in response to the output of amplifier 43 being zero and positive, respectively; the flip-flop is triggered into the activated state in response to the trailing edge of the output of oscillator 35, which occurs one-half cycle of the oscillator output after a negative going transition can occur in the output of amplifier 43.

Flip-flop 51 includes a Q output terminal on which is derived a zero voltage in response to a positive voltage being applied to the J input of the flip-flop by the output of amplifier 43 during the cycle of oscillator 35 immediately preceding a trailing edge at the flip-flop clock input. A negative going output transition of amplifier 43 is coupled to the K input of flip-flop 51 so a positive voltage is derived from the Q output terminal of the flip-flop in response to the clock pulse trailing edge. The bi-level output of flip-flop 51 is supplied via resistor 54 to an inverting input of d.c. operational amplifier 55, having a noninverting input connected to a positive d.c. reference voltage at terminal 56 by a resistive voltage divider including series resistor 57 and shunt resistor 58. Connected between an output terminal of amplifier 55 and the amplifier inverting input terminal is capacitor 59, whereby amplifier 55 and the circuitry associated therewith function as an integrator or low pass filter for the rectangular square wave output of flip-flop 51. The output of amplifier 55 is coupled to an inverting input terminal of d.c. operational amplifier 61 by input resistor 62. Amplifier 61 includes a noninverting input terminal connected by resistor 63 to ground, as well as an output terminal that is connected by feedback resistor 64 to the amplifier inverting input terminal. Amplifier 61 thereby functions as an inverter so that the d.c. voltage developed at the amplifier output terminal and coupled to the input of function generator 23 increases in response to the a.c. voltage applied to the inverting input of amplifier 43 being less in amplitude than the reference voltage applied to the non-inverting input of amplifier 43. Conversely, in response to the a.c. voltage applied by amplifier 38 having an amplitude greater than the reference voltage applied to the noninverting input of amplifier 43, amplifier 61 derives a lower output voltage, to decrease the chopping frequency applied by function generator 23 to inverter 22. If the system is operating at maximum power point 18, during a first cycle of oscillator 35 flip-flop 51 supplies a positive voltage to the inverting input of amplifier 55, to reduce the integrated output voltage of the amplifier. During the next cycle of oscillator 35, flip-flop 51 supplies a zero voltage to the inverting input of amplifier 55, to increase the amplifier integrated output voltage. Thereby, the integrated output of amplifier 55 remains constant on a long-term basis and the average, fundamental chopping frequency of inverter 22 is basically stabilized.

While there has been described and illustrated one specific embodiment of the invention, it will be clear that variations in the details of the embodiment specifically illustrated and described may be made without departing from the true spirit and scope of the invention as defined in the appended claims. For example, the procedure could be reversed, whereby a constant voltage change is developed across panel 11 and the resulting current change is monitored, to determine if the current change has a slope along curve segment 16 or 17.

What is claimed is:

1. A method of controlling the d.c. output power derived from a photovoltaic solar panel and the power supplied by the panel to a load, the panel having a family of curves for voltage versus current output parameters of the panel, the open circuit voltage of each curve in the family increasing as the level of incident solar energy on the panel increases for a predetermined temperature, each of said curves having a maximum power point, each curve having slopes with absolute values greater than one and less than unity for currents respectively greater than and less than the maximum power point, comprising responding to one of the parameters derived from the panel; in response to the derived parameter, deriving an indication of whether the absolute value of the slope of the voltage versus current curve of the panel is greater or less than unity; in response to the slope absolute value indication being greater than one adjusting the load to decrease the current supplied by the panel to the load; in response to the slope absolute value indication being less than one adjusting the load to increase the current supplied by the panel to the load.

2. The method of claim 1 wherein the slope is indicated by incrementally changing the load on the panel, and indicating whether the change in value of the monitored parameter in response to the incremental load change is above or below a reference value.

3. The method of claim 2 wherein the reference value is indicative of the d.c. value of one of said parameters.

4. The method of claim 3 wherein the reference value is derived by monitoring the approximate d.c. value of the monitored parameter.

5. The method of claim 1 or 2 or 3 or 4 wherein the monitored parameter is voltage.

6. The method of claim 1 wherein the slope is indicated by incrementally changing the load on the panel, monitoring one of the parameters of the panel to derive an indication of a reference value, and indicating whether the change in value of the monitored parameter in response to the incremental load change is above or below the reference value.

7. A method of indicating whether the current derived from a photovoltaic solar panel should be increased or decreased in order to maximize the output power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising responding to one of the parameters derived from the panel by incrementally changing the load on the panel to indicate whether the absolute value of the slope of the voltage versus current curve of the panel is greater or less than unity, the indicated slope absolute values being greater and less than unity respectively indicating that the current derived from the panel should be decreased and increased.

8. The method of claim 7 further including indicating whether the change in value of the monitored parameter in response to the incremental load change is above or below a reference value.

9. A method of indicating whether the current derived from a photovoltaic solar panel should be increased or decreased in order to maximize the output power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising responding to one of the parameters derived from the panel by incrementally changing the load on the panel to indicate whether the absolute value of the slope of the voltage versus current curve of the panel is greater or less than unity, the indicated slope absolute values being greater and less than unity respectively indicating that the current derived from the panel should be decreased and increased, and indicating whether the change in value of the monitored parameter in response to the incremental load change is above or below a reference value indicative of the d.c. value of one of said parameters.

10. The method of claim 9 wherein the reference value is derived by monitoring the approximate d.c. value of the monitored parameter.

11. The method of claim 10 or 9 wherein the monitored parameter is voltage.

12. Apparatus for controlling the d.c. output power derived from a photovoltaic solar panel and the power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising means responsive to one of the parameters derived from the panel for deriving a signal having a value indicating whether the absolute value of the slope of the voltage versus current curve of the panel is greater or less than unity, the slope indicating means including: means for incrementally changing the load on the panel and means responsive to the incremental load change for comparing the amplitude of the resulting change of the panel monitored parameter with a reference value to indicate whether the slope absolute value is greater or less than one; means responsive to the signal value indicating the slope absolute value being greater than one and less than one for adjusting the load to respectively decrease and increase the current supplied by the panel to the load.

13. The apparatus of claim 12 wherein the reference value is indicative of the d.c. value of one of said parameters.

14. The apparatus of claim 13 wherein the reference value is derived by means for monitoring the approximate d.c. value of the monitored parameters.

15. The apparatus of claim 14 wherein the d.c. value monitoring means includes means responsive to the d.c. output voltage of the panel, and means for attenuating virtually all variations in the d.c. panel output voltage as a result of the load change.

16. The apparatus of claim 12 or 13 or 14 wherein the monitored parameter is voltage.

17. The apparatus of claim 12 wherein the means for deriving a signal indicating the slope value includes means for incrementally changing the load on the panel, means for monitoring one of the parameters of the panel to derive an indication of a reference value, and means responsive to the incremental load change for comparing the amplitude of the resulting change of the panel monitored parameter with the reference value to indicate whether the slope absolute value is greater or less than one.

18. Apparatus for indicating whether the current derived from a photovoltaic solar panel should be increased or decreased in order to maximize the output power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising means for incrementally changing the load on the panel, whereby a change in the panel output voltage results from the change in load, the magnitude of the voltage change being dependent on the slope of the curve for the incident radiation and temperature and the load change, and means responsive only to the voltage change resulting from the incremental load change for indicating whether the change in the panel voltage resulting from the incremental load change is above or below a reference value.

19. Apparatus for indicating whether the current derived from a photovoltaic solar panel should be increased or decreased in order to maximize the output power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising means for incrementally changing the load on the panel, whereby a change in the panel output voltage results from the change in load, the magnitude of the voltage change being dependent on the slope of the curve for the incident radiation and temperature and the load change, and means for indicating whether the change in the panel voltage resulting from the incremental load change is above or below a reference value, means responsive to the incremental load change for comparing the amplitude of the resulting change of the panel voltage with a reference value to indicate whether the slope absolute value is greater or less than one.

20. The apparatus of claim 19 wherein the reference value is indicative of the d.c. value of one of said parameters.

21. The apparatus of claim 20 wherein the reference value is derived by means for monitoring the approximate d.c. value of the monitored parameter.

22. The apparatus of claim 19 wherein the d.c. value monitoring means includes means responsive to the d.c. output voltage of the panel, and means for attenuating virtually all variations in the d.c. panel output voltage as a result of the load change.

23. The apparatus of claim 21 wherein the monitored parameter is voltage.

24. The apparatus of claim 19 wherein the means for indicating includes means for monitoring one of the parameters of the panel to derive the reference value.

25. Apparatus for maximizing the power supplied by a photovoltaic solar panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising an inverter connected between the panel and load for chopping the d.c. output of the panel into a pseudo-sinusoidal waveform, said inverter supplying increasing current and power from the panel to the load as the chopping frequency thereof increases, means responsive to one of the output parameters of the panel for controlling the frequency of the inverter so that the current and voltage derived by the panel are at the maximum power point for the solar energy incident on and the temperature of the panel, wherein the frequency controlling means includes means for sensing the slope of the curve, and means responsive to the sensed slope for controlling the frequency.

26. The apparatus of claim 25 wherein the slope sensing means includes means for incrementally changing the load on the panel whereby a change in the panel output voltage results from the change in the inverter frequency, the magnitude of the voltage change being dependent on the slope of the curve for the incident radiation and temperature and the load change, and means for indicating whether the change in the panel voltage resulting from the incremental load change is above or below a reference value.

27. The apparatus of claim 26 wherein the reference value is indicative of the d.c. output voltage of said panel.

28. The apparatus of claim 27 wherein the reference value is derived by means for monitoring the approximate d.c. output voltage of the panel.

29. The apparatus of claim 26 wherein the d.c. value monitoring means includes means responsive to the d.c. output voltage of the panel, and means for attenuating virtually all variations in the d.c. panel output voltage as a result of the load change.

30. The apparatus of claim 26 wherein the reference value is indicative of an output parameter of the panel.

31. The apparatus of claim 18, 20, 21, 22, 26, 27, 28 or 29 wherein the means for incrementally loading includes a resistive impedance in shunt with the panel, and means for incrementally changing the impedance from time to time.

32. A method of indicating whether the current derived from a photovoltaic solar panel should be increased or decreased in order to maximize the output power supplied by the panel to a load, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising responding to one of the parameters derived from the panel by incrementally changing the load on the panel to indicate whether the absolute value of the slope of the voltage versus current curve of the panel is greater or less than unity, the indicated slope absolute values being greater and less than unity respectively indicating that the current derived from the panel should be decreased and increased, and indicating whether the change in value of the monitored parameter in response to the incremental load change is above or below a reference value indicative of the value of one of said parameters.

33. In combination, a photovoltaic solar panel, an a.c. load of the type wherein power delivered to it increases as frequency delivered to it increases, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, an inverter connected between the panel and load for chopping the d.c. output of the panel into a pseudo-sinusoidal waveform, said inverter supplying increasing current and power from the panel to the load as the chopping frequency thereof increases, means responsive to one of the output parameters of the panel for controlling the frequency of the inverter so that the current and voltage derived by the panel are at the maximum power point for the solar energy incident on and the temperture of the panel, wherein the frequency controlling means includes means for sensing the slope of the curve, and means responsive to the sensed slope for controlling the frequency.

34. The combination of claim 33 wherein the slope sensing means includes means for incrementally changing the load on the panel whereby a change in the panel output voltage results from the change in the inverter frequency, the magnitude of the voltage change being dependent on the slope of the curve for the incident radiation and temperature and the load change, and means for indicating whether the change in the panel voltage resulting from the incremental load change is above or below a reference value.

35. The combination of claim 34 wherein the reference value is indicative of the d.c. output voltage of said panel.

36. The combination of claim 34 wherein the reference value is derived by means for monitoring the approximate d.c. output voltage of the panel.

37. The combination of claim 36 wherein the d.c. value monitoring means includes means responsive to the d.c. output voltage of the panel, and means for attenuating virtually all variations in the d.c. panel output voltage as a result of the load change.

38. The combination of claim 34 wherein the reference value is indicative of an output parameter of the panel.

39. A method of indicating whether the current derived from a photovoltaic solar panel should be increased or decreased in order to enable the output power supplied by the panel to a load to be maximized, the panel having a family of curves for voltage versus current output parameters of the panel, the open circuit voltage of each curve in the family increasing as the level of incident solar energy on the panel increases for a predetermined temperature, said curves having a maximum power point, the curves having slopes with absolute values greater than one and less than one for currents respectively greater than and less than the maximum power point, comprising responding to one of the parameters derived from the panel by incrementally changing the load on the panel to indicate whether the absolute value of the slope of the voltage versus current curve of the panel is greater or less than unity, the indicated slope absolute values being greater and less than unity respectively indicating that the current derived from the panel should be decreased and increased.

40. The method of claim 39 wherein the slope is indicated by indicating whether the change in value of the monitored parameter in response to the incremental load change is above or below a reference value.

41. The method of claim 39 or 40 wherein the load is incrementally changed from time to time by changing the value of a resistive impedance shunting the panel.

42. The apparatus of claim 23 wherein the means for incrementally loading includes a resistive impedance in shunt with the panel, and means for incrementally changing the impedance from time to time.

* * * * *